Oct. 18, 1949.  H. J. HOFF  2,485,096
MACHINE FOR FORMING LAWN MOWER HANDLES AND THE LIKE
Filed April 17, 1946  3 Sheets-Sheet 1
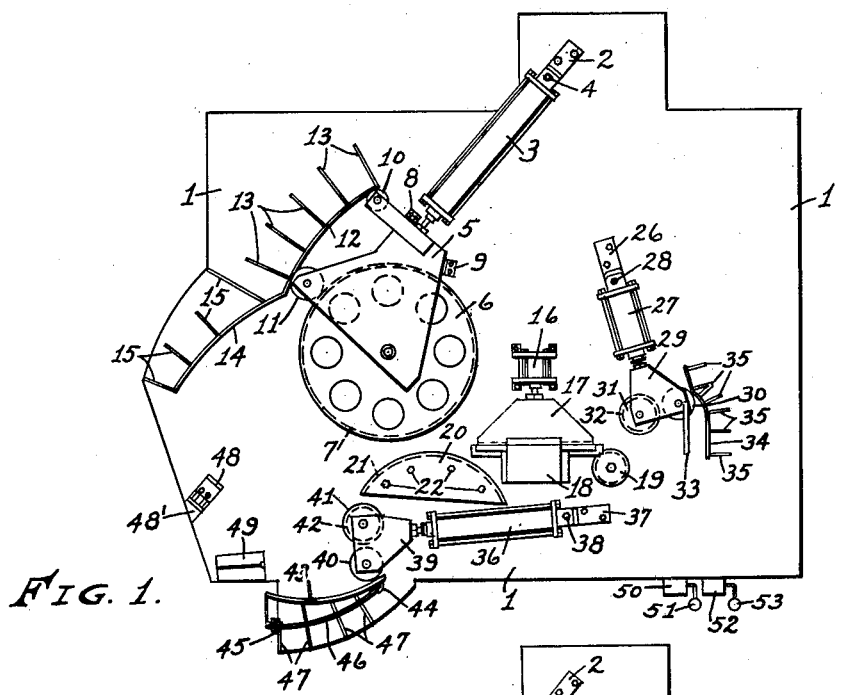
FIG. 1.
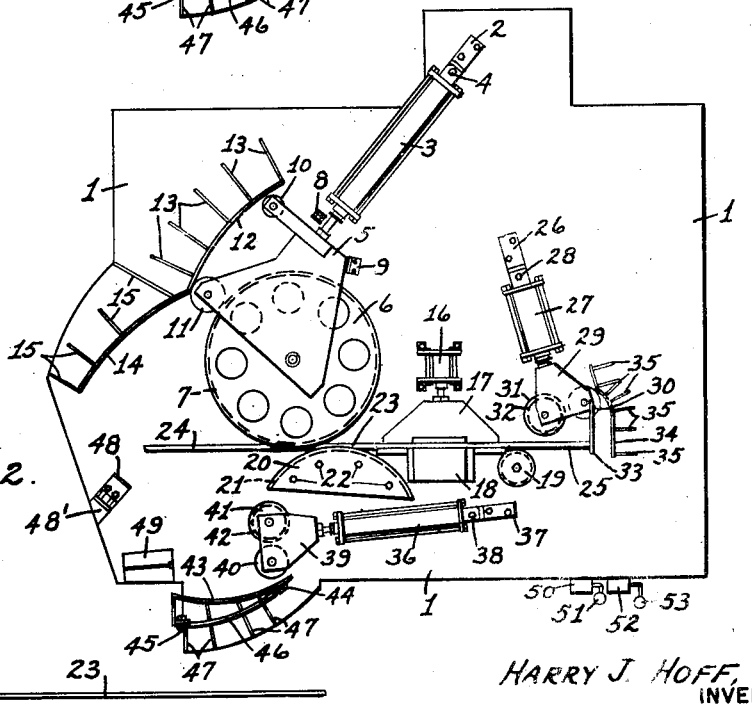
FIG. 2.
FIG. 3.
HARRY J. HOFF,
INVENTOR.
BY Donald E. Windle
ATTORNEY.

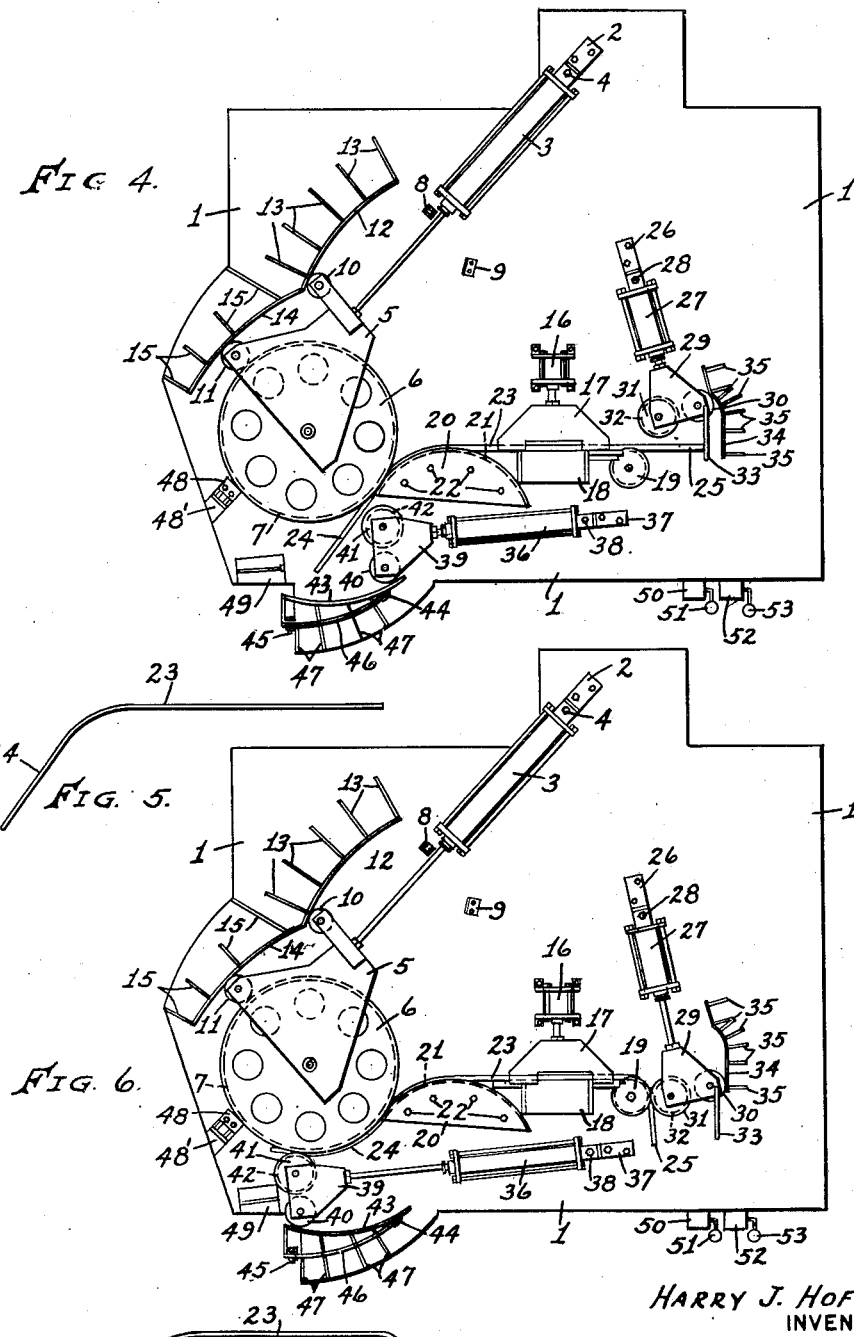

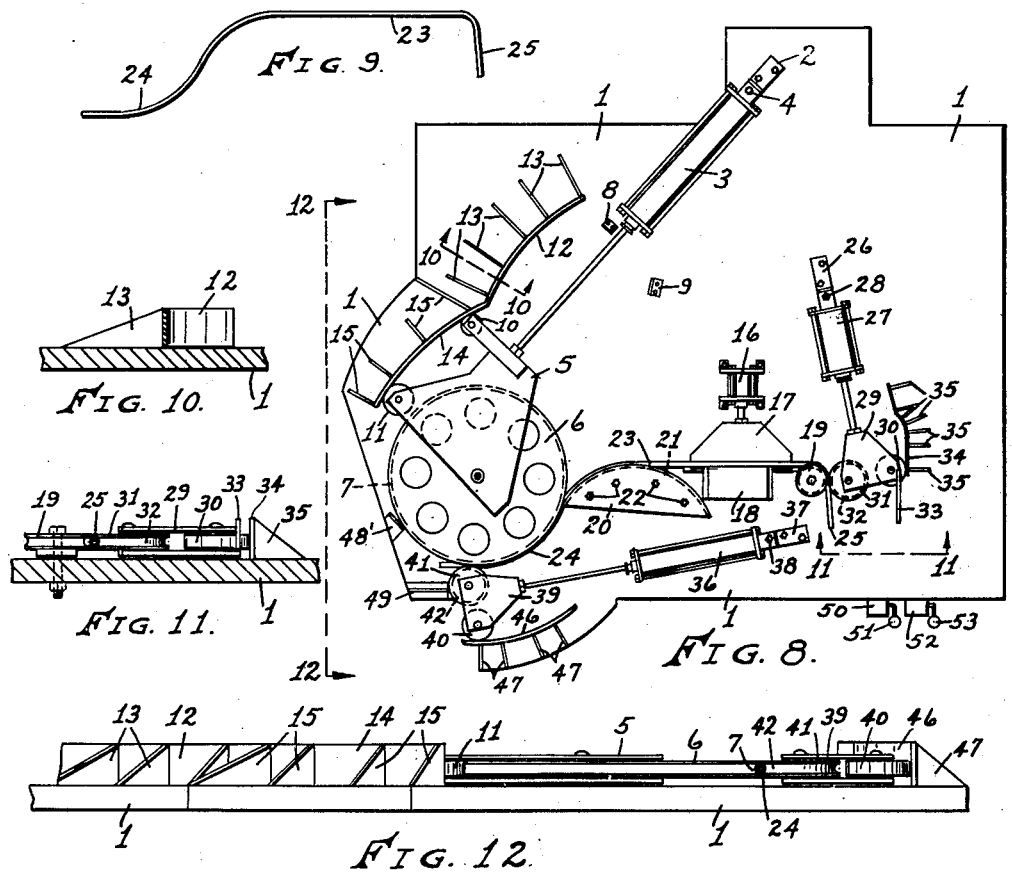

Patented Oct. 18, 1949

2,485,096

UNITED STATES PATENT OFFICE 2,485,096

MACHINE FOR FORMING LAWN MOWER HANDLES AND THE LIKE

Harry J. Hoff, Richmond, Ind.

Application April 17, 1946, Serial No. 662,891

1 Claim. (Cl. 153—46)

The principal object of the invention is the provision of machines for forming lawn mower handles consistently uniform and accurate to prescribed dimensions and profiles.

Another object is the provision of machines for forming and banding lawn mower handles with a minimum of time being consumed thereby and with the cost thereof being considerably reduced over other methods of forming and banding.

A further object is the provision of machines for forming lawn mower handles which are simple of construction, and which are economical and easy of operation.

Other objects and advantages of the invention will suggest themselves in the course of the following description, and that which is new and novel will be set forth in the claim.

The most satisfactory manner of carrying out the principles of the invention in a practical and efficient manner is shown in the accompanying drawings, in which:

Figure 1 is a detail plan view of the forming machine with the several parts thereof being shown in their normal and retracted positions.

Figure 2 is a detail plan view similar to Figure 1 but with a tubing member being shown therein and previous to the forming thereof.

Figure 3 shows a tubing member as introduced into the bending or forming machine and before the same has been formed.

Figure 4 is a detail plan view of the forming machine and showing the positions of the parts thereof with the first forming operation of the tubing member, and with Figure 5 showing the tubing member after the first forming operation.

Figure 6 is a detail plan view of the forming machine, with the members thereof being shown in the second and final stage of the forming operations, and with Figure 7 showing the tubing after the final forming operation.

Figure 8 is a detail plan view of the forming machine having members removed therefrom and providing for forming handle members of different span than those shown in Figures 1 through 7.

Figure 9 shows the product of the forming machine when arranged as shown in Figure 8.

Figure 10 is a detail section through one of the guide members of the forming machine, as taken on line 10—10 of Figure 8.

Figure 11 is a detail section taken on line 11—11 of Figure 8, and showing the forming members which form the hand grip portion of the handle.

Figure 12 is a partial detail elevation of the forming machine, taken from line 12—12 of Figure 8.

Like characters of reference designate like parts throughout the several views.

It will be noted, by reference to the drawings, that conduits leading to the compression cylinders have been omitted from Figures 1, 2, 4, 6 and 8 in order to clarify the details. Also, the use of conduits in connection with cylinders is old in the art, and does not constitute invention.

Referring now to the drawings in detail, numeral 1 designates the table or base on which the forming members are secured in their relative positions.

Numeral 2 designates a fastening for cylinder 3, with the cylinder being pivotally attached thereto by means of a pin or bolt 4. The wheel housing 5, in which forming wheel 6 is rotatably secured, is attached to the end portion of the piston rod of cylinder 3. It will be noted that wheel 6 has a forming groove 7 in the periphery thereof and which provides a contacting surface for the tubing from which the handle is formed. 8 and 9 designate stop members which limit the travel of the housing 5 toward cylinder 3, with each of the stop members being rigidly secured to the upper surface of the table 1. Roller members 10 and 11 are secured in housing 5, with the same being adapted to bear against retaining members 12 and 14, with the retaining members 12 and 14 being securely braced by means of rib members 13 and 15 respectively.

Cylinder 16 is rigidly secured to the table 1 and provides means actuating clamping member 17 toward and away from the fixed clamping member 18 against which the tube member 23 is positioned prior to the forming operations. Pressure of member 17 against the tube 23 toward fixed clamping member 18 provides means rigidly securing the tube 23 in place with relation to the forming members. Wheel 19, having a groove formed in its periphery, is nonrotatably secured to the table 1 and is located adjacent one end of the fixed clamping member 18, and provides means around which the grip end 25 of the tube is formed. Member 20 is a segment formed to the correct shape to form a portion of the profile of end 24 of the tube member 23, with the segment being rigidly secured to the table 1 by means of bolts or screws 22, and with the segment having a groove 21 formed in the curved edge thereof.

26 designates a fastening for cylinder 27 which is pivotally secured thereto by means of bolt or pin 28 and which permits pivotal movement of cylinder 27 with relation to the fastening means 26 which is rigidly secured to table 1. Housing 29 is secured to the projecting end of the piston rod of cylinder 27, and in which are secured wheels 30 and 31. Wheel 30 has a smooth tread and is adapted to bear against guide 34, with guide 34 being rigidly secured to table 1 and securely braced by means of ribs 35. Wheel 31 has a groove 32 formed in the periphery thereof and which is adapted to contact grip end 25 of the tube 23 in the forming operation. A stop member 33 is rigidly secured to housing 29 and provides means gaging the longitudinal position of tube 23 when the tube is placed against the fixed clamping member 18 prior to forming.

A fourth cylinder 36 is pivotally secured to fastening 37 by means of bolt or pin 38, with housing 39 being secured to the projecting end of the piston rod which projects from cylinder 36. Wheels 40 and 41 are secured in the housing 39 with wheel 40 having a smooth tread and being adapted to bear against guide member 43 in its operation upon contact with end portion 24 of the tube 23, as more clearly shown in Figures 4 and 6. Wheel 41 has a groove 42 formed in the periphery thereof and which provides for the reception of end portion 24 of the tube 23 in the forming operation.

It will be noted, by reference to Figures 1, 2, 4 and 6 that guide member 43 has a hook portion 44 formed thereon near one end thereof with the hook portion being adapted to engage the adjacent end of another guide member 46. Guide 43 is removably secured to one end of guide 46 by means of bolt 45. Guide 46 is permanently secured to table 1 and has rib members 47 providing additional rigidity thereto. Similar ribs are formed on guide 43 to provide a bracing effect between guides 43 and 46.

A removable stop member 48 is provided, against which the movement of wheel 6 is arrested at the end of its forming operation as shown in Figures 4 and 6, and limits the movement of the wheel in forming a handle member of one particular span. A second stop member 48' is secured to the table 1 and provides a limit to the movement of wheel 6 in the forming operation of a handle of a different span, all as shown in Figure 8.

A stop member 49 provides means limiting the thrust movement of wheel 41 in forming the portion 24 of the handle member.

Valves 50 and 52 are preferably mounted at the edge of table 1 within easy reach of the operator, with the valves being provided with control levers 51 and 53 respectively. The actions of cylinders 3 and 16 are controlled through valve 50 by means of lever 51, with both of the cylinders being operated simultaneously through the means of pressure supplied thereto through conduits (not shown) extending to the cylinders from valve 50. Cylinders 27 and 36 are both controlled simultaneously through valve 52 by means of lever 53, with the conduits extending therebetween not being shown in the drawings.

In the operation of the forming machine, the tube member 23 is placed against the fixed clamping member 18, and with one end of the tube bearing against stop member 35, after which valve 50 is opened by means of lever 51. Due to the short travel of the clamping member 17, the same clamps against tube 23 before wheel 6 contacts the tube. Continued holding open of valve 50 by means of lever 51 causes wheel 6 to be thrust away from its cylinder 3, and into contact with tube 23, with continuation of the movement of wheel 6, together with the action of the contact of wheels 10 and 11 against guides 12 and 14, the tube is formed against and assumes the profile of segment 20 with the tube entering groove 21 approximately one half the diameter of the tube, as more clearly shown in Figure 4. After wheel 6 has reached its limit of travel, the position thereof is retained as valve 52 is operated by means of lever 53. Cylinders 27 and 36 are both connected by conduits (not shown) with valve 52, and operate simultaneously. As pressure is applied to cylinders 27 and 36, housings 29 and 39 are thrust away from their respective cylinders. Wheel 31, carried by housing 29 engages the grip end 25 of the handle member and forms the same around the fixed wheel 19, as shown in Figures 6 and 8, and with the wheel 30 bearing against the adjacent guide 34. Likewise, wheel 41, carried by housing 39, engages end portion 24 of the handle member and forms the same around the periphery of wheel 6, as shown in Figures 6 and 8, and with wheel 40 bearing against either guide 43 or 46.

After the forming of the handle member has been completed as shown in Figures 7 and 9, levers 51 and 53 are moved to a reverse position, and causing the pistons of cylinders 3, 16, 27 and 36 to be retracted to their original positions, as shown in Figure 1, after which the handle member is removed from the forming machine.

It will be observed that the above-described operation forms one-half of a completed handle, and that two such members are required for a complete handle assembly.

In the manufacture and assembly of the completed handles, two of the members are placed together but in oppositely disposed relation, and welded together at their central portions.

It will be noted, from the drawings, and from the above description, that the handles are expeditiously and uniformly formed. It is to be understood that the cylinders may be operated pneumatically or hudraulically with equal efficiency.

I desire it to be understood that, while the machine is shown and described as being used for the purpose of forming lawn mower handles, machines embodying the principles of the invention may be used in connection with the forming operations of tubular members for purposes other than for lawn mower handles.

I further desire that it be understood that I am not to be limited to the exact form and arrangements of the several parts herein shown and described, but that minor changes may be made therein, insofar as the changes may fall within the scope of the claim.

Having now shown and described the invention, what I claim and desire to secure by Letters Patent of the United States is:

In a machine for forming lawn mower handle members, a supporting table member, a clamping unit secured to the table and adapted to rigidly secure a tubular member, a stop member adapted to position the tubular member with relation to the clamping unit, a grip forming means movably secured to said table, a guide rigidly secured to said table with the guide being engageable by a portion of the grip forming means, a segmental member secured to the table with a groove being formed in the periphery thereof and engageable by the tubular member, a forming wheel movably secured to the table and engageable with the tubular member at its contact with the segmental member, a second forming wheel bending the tubular member into shape with the first forming wheel providing a predetermined shape against which the end of the tubular member is formed by contact of the second forming wheel rolling thereagainst.

HARRY J. HOFF.

(References on following page)

REFERENCES CITED

The following references are of record in the file of this patent:

UNITED STATES PATENTS

| Number | Name | Date |
|---|---|---|
| 275,741 | Wren | Apr. 10, 1833 |
| 641,535 | McKibben | Jan. 16, 1900 |
| 653,704 | Scott | July 17, 1900 |
| 757,870 | High | Apr. 19, 1904 |
| 1,666,380 | Heinle | Apr. 17, 1928 |
| 1,710,250 | Young | Feb. 5, 1929 |
| 1,720,133 | Le Roy | July 9, 1929 |
| 1,936,611 | Young | Nov. 28, 1933 |
| 1,981,162 | Brown | Nov. 20, 1934 |
| 2,282,542 | Enghauser | May 12, 1942 |
| 2,286,255 | Brooks | June 16, 1942 |
| 2,305,850 | Drysdale | Dec. 22, 1942 |
| 2,318,344 | Urschel | May 4, 1943 |
| 2,339,410 | Keller | Jan. 18, 1944 |
| 2,365,803 | Chambers et al. | Dec. 26, 1944 |
| 2,391,891 | Frankel | Jan. 1, 1946 |
| 2,414,926 | Burke | Jan. 28, 1947 |

FOREIGN PATENTS

| Number | Country | Date |
|---|---|---|
| 467,647 | France | Apr. 3, 1914 |